(12) United States Patent
Jung et al.

(10) Patent No.: US 8,498,357 B2
(45) Date of Patent: Jul. 30, 2013

(54) TRANSMITTING/RECEIVING APPARATUS AND METHOD FOR INTERLEAVER DIVISION MULTIPLE ACCESS SYSTEM

(75) Inventors: Young-Seok Jung, Seoul (KR); Kwang-Man Ok, Gyeonggi-do (KR); Chae-Man Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1343 days.

(21) Appl. No.: 12/222,939

(22) Filed: Aug. 20, 2008

(65) Prior Publication Data

US 2009/0060094 A1 Mar. 5, 2009

(30) Foreign Application Priority Data

Sep. 5, 2007 (KR) .......................... 10-2007-0089756

(51) Int. Cl.
*H04B 7/02* (2006.01)
*H04L 1/02* (2006.01)
(52) U.S. Cl.
USPC ........................................................ 375/267

(58) Field of Classification Search
USPC .......................................... 375/260, 267, 316
See application file for complete search history.

(56) References Cited

U.S. PATENT DOCUMENTS

| 2005/0068931 A1* | 3/2005 | Cho et al. ...................... 370/345 |
| 2006/0093065 A1* | 5/2006 | Thomas et al. ................ 375/299 |
| 2008/0285667 A1* | 11/2008 | Mondal et al. ................ 375/260 |
| 2010/0208839 A1* | 8/2010 | Walton et al. ................. 375/267 |

\* cited by examiner

*Primary Examiner* — Chieh M Fan
*Assistant Examiner* — Freshteh N Aghdam
(74) *Attorney, Agent, or Firm* — Roylance, Abrams, Berdo and Goodman, LLP (57) ABSTRACT

Provided is a transmitting/receiving apparatus and method for an IDMA system. The receiving apparatus includes a channel estimator, an estimator, and a determiner. The channel estimator estimates a channel using a multi-user signal received through at least one RX antenna. The estimator estimates the noise power and the signal power for each transmission layer of each user by using the estimated channel value from the channel estimator. The determiner determines the number of transmission layers for each user and an MCS level for each transmission layer by using the signal power and the noise power estimated by the estimator.

15 Claims, 7 Drawing Sheets

TRANSMITTING/RECEIVING APPARATUS AND METHOD FOR INTERLEAVER DIVISION MULTIPLE ACCESS SYSTEM

PRIORITY

This application claims priority under 35 U.S.C. § 119(a) from Korean Patent Application No. 2007-89756 filed on Sep. 5, 2007, in the Korean Intellectual Property Office, the entire contents of which are incorporated herein by reference.

BACKGROUND OF THE INVENTION

1. Field of the Invention

The present invention relates generally to a transmitting/receiving apparatus and method for an Interleaver Division Multiple Access (IDMA) system. In particular, the present invention relates to an apparatus and method for determining at a receiver the number of transmission layers, a modulation order, and a coding rate adaptively according to the channel states and transmitting signals according to the determined feedback information from the receiver.

2. Description of the Related Art

There have been proposed various schemes for allowing many user terminals to gain multiple access to a central device (for example, a base station). Typical examples of the multiple access schemes are Time Division Multiple Access (TDMA), Frequency Division Multiple Access (FDMA), Code Division Multiple Access (CDMA), and Space Division Multiple Access (SDMA) schemes. An Interleaver Division Multiple Access (IDMA) scheme, which allows users to gain multiple access by using different interleaving schemes, is emerging as a new multiple access scheme.

The upcoming communication systems are expected to use some of the above multiple access schemes in combination. An example of the combination-type multiple access scheme is to apply the SDMA scheme and/or the IDMA scheme to an Orthogonal Frequency Division Multiple Access (OFDMA) scheme that is regarded as a promising candidate for the next-generation communication scheme.

A Direct Sequence-Code Division Multiple Access (DS-CDMA) scheme extends the bandwidth of a user by a spread sequence. Unlike the DS-CDMA scheme, the IDMA scheme extends the bandwidth of a user by a channel code having the high error correction capability of a low coding rate and discriminates between users by different interleavers. A receiver detects each user signal using a multi-user detection scheme linked with a channel decoder.

The IDMA scheme can be used in combination with a Multiple Input Multiple Output (MIMO) scheme. The IDMA scheme may be adopted in the next-generation communication system. In this case, the number of transmission layers, a modulation order, and a coding rate must be changed adaptively according to the channel states, for maximization of the transmission efficiency (for example, throughput). However, no method has been proposed to determine the number of transmission layers, a modulation order, and a coding rate adaptively according to the channel states in the conventional IDMA system.

Accordingly, there is a need for an improved apparatus and method capable of determining the number of transmission layers, a modulation order, and a coding rate adaptively according to the channel states in the conventional IDMA system.

SUMMARY OF THE INVENTION

Exemplary embodiments of the present invention substantially solve at least the above problems and/or disadvantages and provide at least the advantages below. Accordingly, an object of exemplary embodiments of the present invention is to provide an apparatus and method for maximizing transmission efficiency in an IDMA system using multiple TX antennas.

It is another object of the present invention to provide an apparatus and method for changing the number of transmission layers, a modulation order, and an error correction code adaptively according to the channel states in an IDMA system using multiple TX antennas.

According to one aspect of an exemplary embodiment of the present invention, there is provided an apparatus and method for determining the number of transmission layers, a modulation order, and an error correction code in an IDMA system using multiple TX antennas.

According to another aspect of an exemplary embodiment of the present invention, there is provided an apparatus and method for preliminarily determining a Modulation and Coding Scheme (MCS) level for each transmission layer by using a Signal-to-Noise Ratio (SNR) and verifying a Signal-to-Interference plus Noise Ratio (SINR) by using the preliminarily determined MCS level, in an IDMA system using multiple TX antennas.

Yet another object of an exemplary embodiment of the present invention is to provide an apparatus and method for determining a transmission layer and an MCS level on a user-by-user basis in an IDMA system having multiple TX antennas.

According to one aspect of an exemplary embodiment of the present invention, a receiving apparatus for an IDMA system includes: a channel estimator for estimating a channel using a multi-user signal received through at least one RX antenna; an estimator for estimating the noise power and the signal power for each transmission layer of each user by using the estimated channel value from the channel estimator; and a determiner for determining the number of transmission layers for each user and an MCS level for each transmission layer by using the signal power and the noise power estimated by the estimator.

According to another aspect of an exemplary embodiment of the present invention, a transmitting apparatus for an IDMA system includes: a controller for determining the number of transmission layers and a modulation order and a coding rate for each transmission layer on the basis of feedback information received from a receiver; a channel encoder for encoding TX data at the determined coding rate; a converter for converting data from the channel encoder into a plurality of streams according to the determined transmission layer number; a plurality of interleavers for interleaving the streams from the converter in different interleaving schemes with respect to different users gaining multiple access thereto; a plurality of modulators for modulating data from the corresponding interleavers at the determined modulation order; and a precoder for generating a plurality of antenna signals by precoding a plurality of streams from the modulators, and transmitting the generated antenna signals through the corresponding antennas.

According to still another aspect of an exemplary embodiment of the present invention, a transmitting apparatus for an IDMA system includes: a controller for determining the number of transmission layers and a modulation order and a coding rate for each transmission layer on the basis of feedback information received from a receiver; a converter for converting TX data into a plurality of streams according to the determined transmission layer number; a plurality of channel encoders for encoding the streams from the converter at the determined coding rate; a plurality of interleavers for interleaving data from the corresponding channel encoders in different interleaving schemes with respect to different users gaining multiple access thereto; a plurality of modulators for modulating data from the corresponding interleavers at the determined modulation order; and a precoder for generating a plurality of antenna signals by precoding a plurality of streams from the modulators, and transmitting the generated antenna signals through the corresponding antennas.

According to even another aspect of an exemplary embodiment of the present invention, a method for an operation of a receiver in an IDMA system includes the steps of: estimating a channel using a multi-user signal received through at least one RX antenna; estimating the noise power and the signal power for each transmission layer of each user by using the estimated channel value; and determining the number of transmission layers for each user and an MCS level for each transmission layer by using the estimated signal power and the estimated noise power.

Other objects, advantages, and salient features of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters exemplified in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Furthermore, the terms used herein are defined according to the functions of exemplary embodiments of the present invention. Thus, the terms may vary depending on user's or operator's intention and usage. Therefore, the terms used herein must be understood based on the descriptions made herein.

An exemplary embodiment of the present invention is intended to provide a scheme for determining the number of transmission layers and an MCS level adaptively according to a channel state in an IDMA system.

The following description is made in the context of an IDMA system using multiple TX antennas, in which the $k^{th}$ user (hereinafter also referred to as a user terminal) can transmit signals to up to M transmission layers (or streams) by using M(k) TX antennas.

Figure 1:
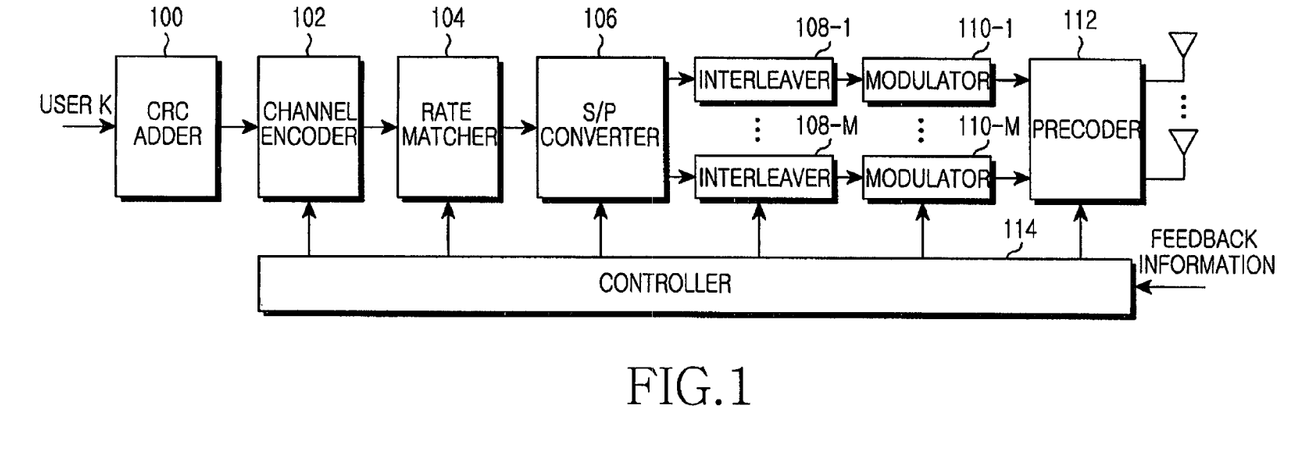
FIG. 1 is a block diagram of a transmitter in an IDMA system according to an exemplary embodiment of the present invention.

FIG. 1 is a block diagram of a transmitter in an IDMA system according to an exemplary embodiment of the present invention. The transmitter may be a user terminal for uplink transmission or a base station for downlink transmission. The following description is made on the assumption that the transmitter is a user terminal for uplink transmission.

Referring to FIG. 1, the transmitter includes a plurality of TX antennas, a Cyclic Redundancy Check (CRC) adder 100, a channel encoder 102, a rate matcher 104, a Serial-to-Parallel (S/P) converter 106, a plurality of interleavers 108-1 to 108-M, a plurality of modulators 110-1 to 110-M, a precoder 112, and a controller 114.

Based on feedback information received from a receiver, the controller 114 determines the number of transmission layers, a modulation order, a coding rate, and a weight matrix. The controller 114 controls the S/P converter 106 according to the determined transmission layer number, controls the precoder 112 according to the determined weight matrix, controls the channel encoder 102 according to the determined coding rate, and controls the rate matcher 104 and the modulators 110-1 to 110-M according to the determined modulation order. In this context, the receiver may provide the feedback information to the transmitter at the request of the transmitter or at time periods determined through signaling negotiation.

The CRC adder 100 calculates an error correction code for user data and adds the error correction code to the user data. The error correction code may be a CRC code.

Under the control of the controller 114, the channel encoder 102 encodes data from the CRC adder 100 at the determined coding rate. For example, the channel encoder 102 may encode the data using Convolutional Codes (CCs), Turbo Codes (TCs), Convolutional Turbo Codes (CTCs), or Low Density Parity Check (LDPC) codes. Because of the characteristics of the IDMA scheme, the channel encoder 102 uses a low coding rate with high error correction capability. For effective implementation, a repetition code and a code with a high coding rate may be combined to achieve the low coding rate. In this case, a masking sequence may be multiplied to equalize the ratios of '0' and '1' of a coded bit stream.

The rate matcher 104 rate-matches data from the channel encoder 102 by repetition and puncturing. For example, under the control of the controller 114, the rate matcher 104 performs the data rate matching based on the determined modulation order.

The S/P converter 106 S/P-converts data from the rate matcher 104 to generate a plurality of streams. For example, under the control of the controller 114, the S/P converter 106 generates as many streams as the determined transmission layer number. Hereinafter, it is assumed that M streams are generated and transmitted.

Each of the interleavers 108-1 to 108-M interleaves a stream from the S/P converter 106. The interleavers 108-1 to 108-M may use the same interleaving scheme or different interleaving schemes. The interleaving schemes used by the interleavers may be determined through signaling negotiation at call setup. For the purpose of IDMA, user terminals perform interleaving in different schemes.

Each of the modulators 110-1 to 110-M modulates a stream from the corresponding interleaver 108. That is, the modulators 110-1 to 110-M map bits from the interleaver 108 to a signal constellation point based on a modulation scheme. For example, the modulators 110-1 to 110-M perform modulation in the determined modulation scheme (or modulation order) under the control of the controller 114. Examples of the modulation scheme are QPSK (Quadrature Phase Shift Keying), 8 PSK, 16 QAM (Quadrature Amplitude Modulation), 32 QAM, and 64 QAM.

The precoder 112 generates a plurality of antenna signals by multiplying a plurality of streams from the modulators 110-1 to 110-M by a weight matrix (or a precoding matrix) based on the feedback information. The precoder 112 transmits the generated antenna signals through the corresponding TX antennas. If precoding is unnecessary, the precoder 112 simply outputs the streams of the modulators 110-1 to 110-M without precoding the same.

Although not illustrated in FIG. 1, in the case of an OFDM system, the antenna signals from the precoder 112 are OFDM-modulated by Inverse Fast Fourier Transform (IFFT), the OFDM-modulated signals are converted into Radio-Frequency (RF) signals, and the RF signals are transmitted through the corresponding TX antennas. In FIG. 1, the positions of the rate matcher 104 and the SP converter 106 are interchangeable with each other.

Figure 2:
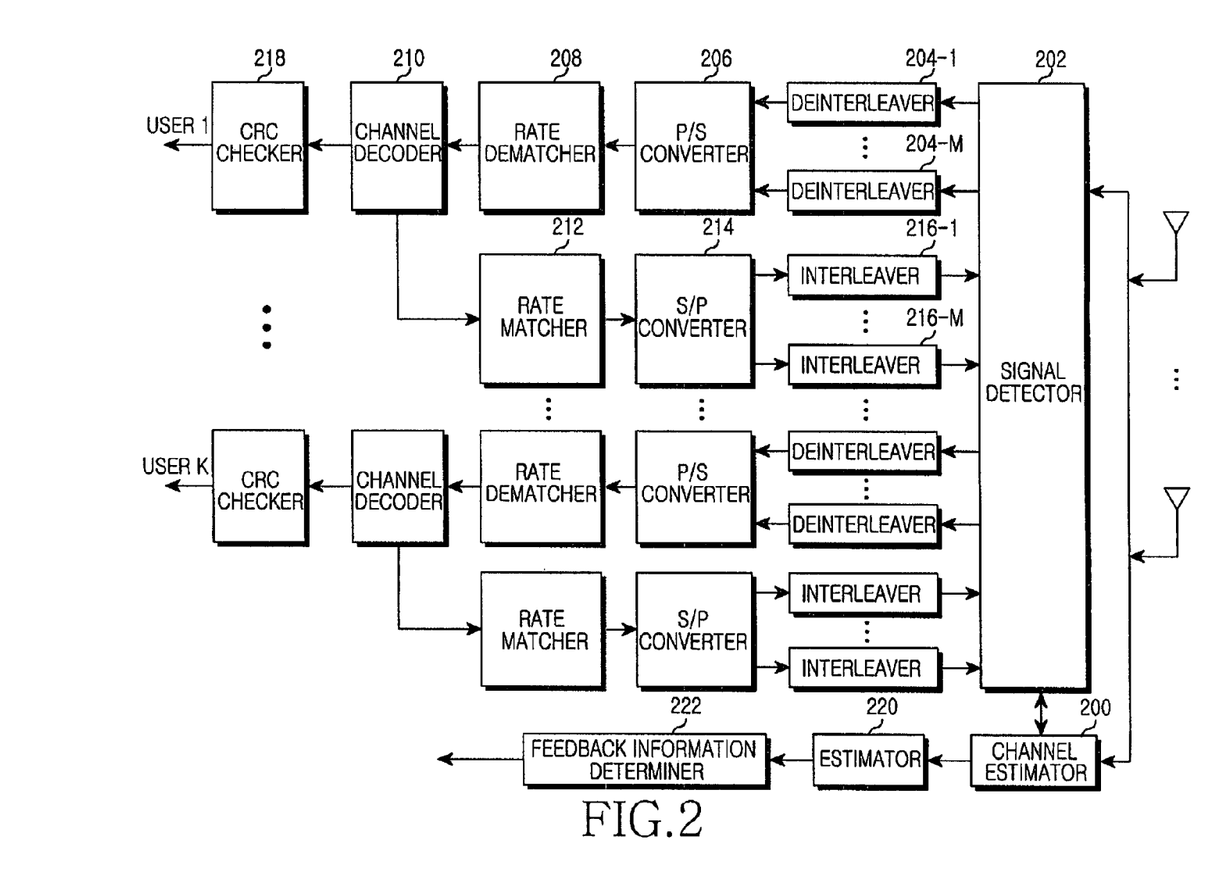
FIG. 2 is a block diagram of a receiver corresponding to the transmitter of FIG. 1.

FIG. 2 is a block diagram of a receiver corresponding to the transmitter of FIG. 1. The receiver may be a base station for uplink transmission or a user terminal for downlink transmission. The following description is made on the assumption that the receiver is a base station for uplink transmission. Signals of users are detected and demodulated using the same structure and thus only the signal of the first user (User 1) will be described herein.

Referring to FIG. 2, for the first user (User 1), the receiver includes a plurality of RX antennas, a channel estimator 200, a signal detector 202, a plurality of deinterleavers 204-1 to 204-M, a Parallel-to-Serial (P/S) converter 206, a rate dematcher 208, a channel decoder 210, a rate matcher 212, an S/P converter 214, a plurality of interleavers 216-1 to 216-M, a CRC checker 218, an estimator 220, and a feedback information determiner 222.

The channel estimator 200 extracts pilot signals (or sounding signals) from signals received through at least one antenna, estimates channels using the extracted pilot signals, and provides the estimated channel values ((the number of TX antennas)×(the number of RX antennas)) to the estimator 220. Also, the channel estimator 220 calculates the channel values of equivalent channels ((the number of streams)×(the number of RX antennas)) using the pilot signals and a weight matrix (or a preceding matrix), and provides the calculated channel values to the signal detector 202. Although not illustrated in FIG. 2, in the case of an OFDM system, signals received through a plurality of antennas are converted into baseband sample data, the baseband sample data are OFDM-demodulated by Fast Fourier Transform (FFT), and the OFDM-demodulated signals are provided to the channel estimator 200 and the signal detector 202.

The signal detector 202 detects a stream for each transmission layer of each user by using the channel values received from the channel estimator 200, and provides the detected stream to the corresponding deinterleaver 204. For example, the signal detector 202 detects each stream using the known multi-user detection scheme, calculates the soft-decision value of each bit of the stream, and provides the calculated value to the corresponding deinterleaver 204. For example, the soft-decision value may be a Log Likelihood Ratio (LLR) value. Hereinafter, it is assumed that M streams are received from the first user (User 1).

The deinterleavers 204-1 to 204-M deinterleave soft-decision values from the signal detector 202. The deinterleaver 204-1 to 204-M for the first user may use the same interleaving scheme or different interleaving schemes. Also, the deinterleaving schemes for K users gaining multiple access to the base station are different for the purpose of IDMA. The deinterleaving schemes may be determined through signaling negotiation.

The P/S converter 206 converts parallel data from the deinterleavers 204-1 to 204-M into serial data to output soft-decision values for a channel codeword. The rate dematcher 208 rate-dematches data from the P/S converter 206. The channel decoder 210 channel-decodes soft-decision values from the rate dematcher 208 to correct an error in the soft-decision values. The channel decoder 210 provides the error-corrected soft-decision values or hard-decision values to the rate matcher 212. The feedback route described below is to regenerate signals in the same way as for the transmitter (that is, the user terminal).

The rate matcher 212 rate-matches data from the channel decoder 210 in the same way as in the transmitter. The S/P converter 214 converts data from the rate matcher 212 into parallel data to generate M streams. The interleavers 216-1 to 216-M interleave streams from the S/P converter 214 in the same way as in the transmitter.

The signal detector 202 updates soft-decision values for each stream of the first user by using high-reliability soft-decision values (or hard-decision values) received from the interleavers 216-1 to 216-M. The signal detector 202 provides the updated soft-decision values of each stream to the corresponding deinterleaver 204 to perform iterative detection and decoding. If the above iteration is performed a predetermined number of times, or if the decoding result of the channel decoder 210 satisfies a predetermined condition, the iteration is terminated and the channel decoder 210 provides the decoded data (hard-decision values) resulting from the last iteration to the CRC checker 218.

The CRC checker 218 performs a CRC check on data from the channel decoder 210, and transmits data passed the CRC check to the next layer (for example, Layer 2). If a CRC failure occurs, the CRC checker 218 notifies the CRC failure to an HARQ controller (not illustrated). In this case, the HARQ controller transmits a retransmission request (NACK) signal to a corresponding transmitter.

Signals for the other users are also detected and decoded in the same way as above. The signal detector 202 may provide updated soft-decision values (or hard-decision values) to the channel estimator 200 during the iterative decoding, and the channel estimator 200 may update channel values using the updated soft-decision values. In another embodiment, the signal detector 202 may provide the final soft-decision values to the channel estimator 200 after completion of the iterative decoding, and the channel estimator 200 may estimate the channel of the next RX signal using the final soft-decision values.

The estimator 220 estimates the signal power (or the average power) for each transmission layer of each user, an additive noise, and an interference of another cell using the channel values from the channel estimator 200 to which precoding is not applied. The reason for the exclusion of precoding effects from the signal power estimation is that precoding changes more rapidly than a transmission layer, a modulation order, and a coding rate. Thus, after exclusion of precoding effects, a transmission layer, a modulation order, and a coding rate are optimized and precoding is changed adaptively for the optimized transmission layer, modulation order, and coding rate. The scheme of changing the precoding adaptively for the channel states is well known in the art, and thus its description will be omitted for conciseness.

The feedback information determiner 222 preliminarily determines the number of transmission layers for each user and an MCS level for each transmission layer by using the signal power for each transmission layer of each user, the additive noise, and the interference of another cell, which are received from the estimator 220, and verifies and readjusts the preliminarily-determined MCS level. In this context, the feedback information determiner 222 determines an MCS level for each transmission layer on a user-by-user basis, generates feedback information including the determined number of transmission layers and the determined MCS level for each transmission layer, and transmits the generated feedback information to the corresponding user terminal. The detailed construction and operation of the feedback information determiner 222 will be described later with reference to FIG. 5.

Figure 3:
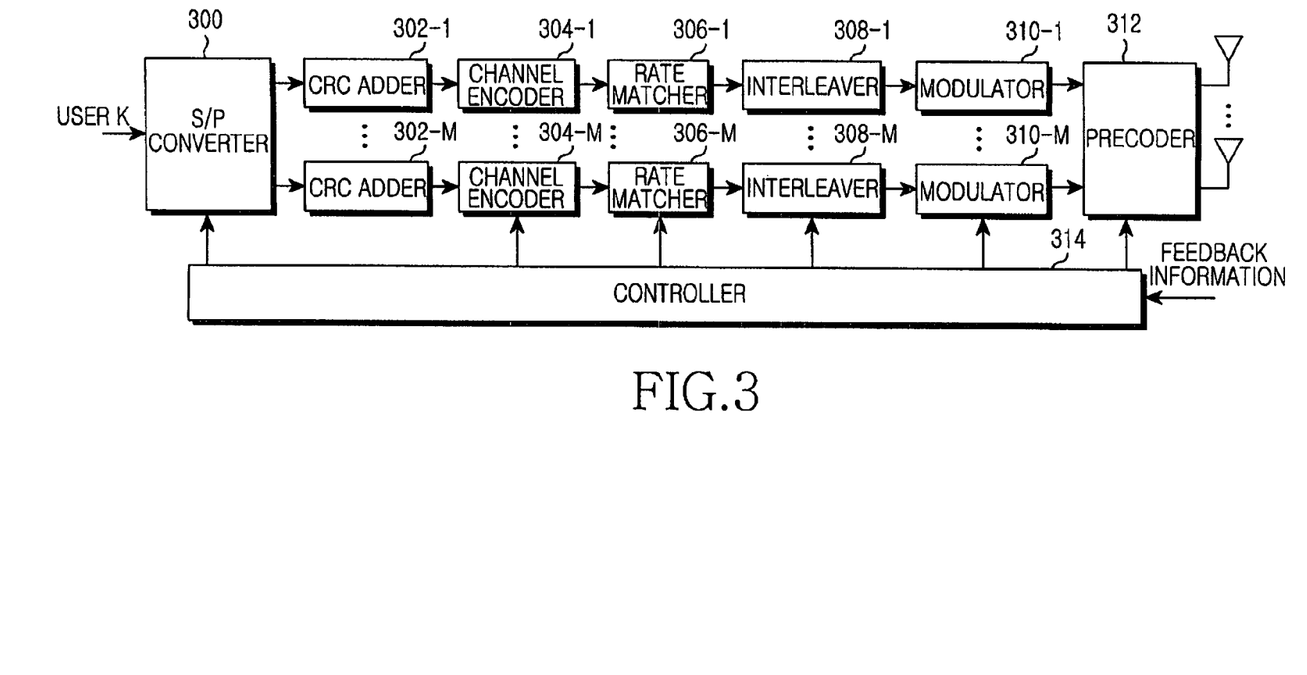
FIG. 3 is a block diagram of a transmitter in an IDMA system according to another exemplary embodiment of the present invention.

FIG. 3 is a block diagram of a transmitter in an IDMA system according to another exemplary embodiment of the present invention. The transmitter may be a user terminal for uplink transmission or a base station for downlink transmission. The following description is made on the assumption that the transmitter is a user terminal for uplink transmission.

Referring to FIG. 3, the transmitter includes an S/P converter 300, a plurality of CRC adders 302-1 to 302-M, a plurality of channel encoders 304-1 to 304-M, a plurality of rate matchers 306-1 to 306-M, a plurality of interleavers 308-1 to 308-M, a plurality of modulators 310-1 to 310-M, a precoder 312, and a controller 314. A description of the overlap of FIG. 3 with FIG. 1 will be omitted for conciseness.

Based on feedback information received from a receiver, the controller 314 determines the number of transmission layers, a modulation order, a coding rate, and a weight matrix. The controller 314 controls the S/P converter 300 according to the determined transmission layer number, controls the precoder 312 according to the determined weight matrix, controls the channel encoders 304 according to the determined coding rate, and controls the rate matchers 306 and the modulators 310 according to the determined modulation order. In this context, the receiver may provide the feedback information to the transmitter at the request of the transmitter or at time periods determined through signaling negotiation.

The S/P converter 300 S/P-converts user data to generate a plurality of streams. For example, under the control of the controller 314, the S/P converter 300 generates as many streams as the determined transmission layer number. Hereinafter, it is assumed that M streams are generated and transmitted.

Each of the CRC adders 302-1 to 302-M adds an error correction code (for example, a CRC code) to data from the S/P converter 300. Under the control of the controller 314, each of the channel encoders 304-1 to 304-M encodes data from the corresponding CRC adder 302 at the corresponding coding rate. For example, the channel encoders 304-1 to 304-M may use the same coding scheme or different coding schemes. For the IDMA, the channel encoders 304-1 to 304-M use a low coding rate with high error correction capability. For effective implementation, a repetition code and a code with a high coding rate may be combined to achieve the low coding rate.

Each of the rate matchers 306-1 to 306-M rate-matches data from the corresponding channel encoder 304 by repetition and puncturing. For example, under the control of the controller 314, the rate matchers 306-1 to 306-M perform the data rate matching based on the determined modulation order.

Each of the interleavers 308-1 to 308-M interleaves data from the corresponding rate matcher 306. The interleavers 308-1 to 308-M may use the same interleaving scheme or different interleaving schemes. The interleaving schemes used by the interleavers may be determined through signaling negotiation with a base station.

Under the control of the controller 314, each of the modulators 310-1 to 310-M modulates data from the corresponding interleaver 308. For example, each of the modulators 310-1 to 310-M maps data from the corresponding interleaver 308 to a signal constellation point according to the corresponding modulation order.

The precoder 312 generates a plurality of antenna signals by multiplying a plurality of streams from the modulators 310-1 to 310-M by a weight matrix (or a precoding matrix) based on the feedback information. The precoder 312 transmits the generated antenna signals through the corresponding TX antennas. If precoding is unnecessary, the precoder 312 simply transmits the streams of the modulators 310-1 to 310-M to the corresponding antennas.

In FIG. 3, the positions of the S/P converter 300 and the CRC adder 302 are interchangeable with each other.

Figure 4:
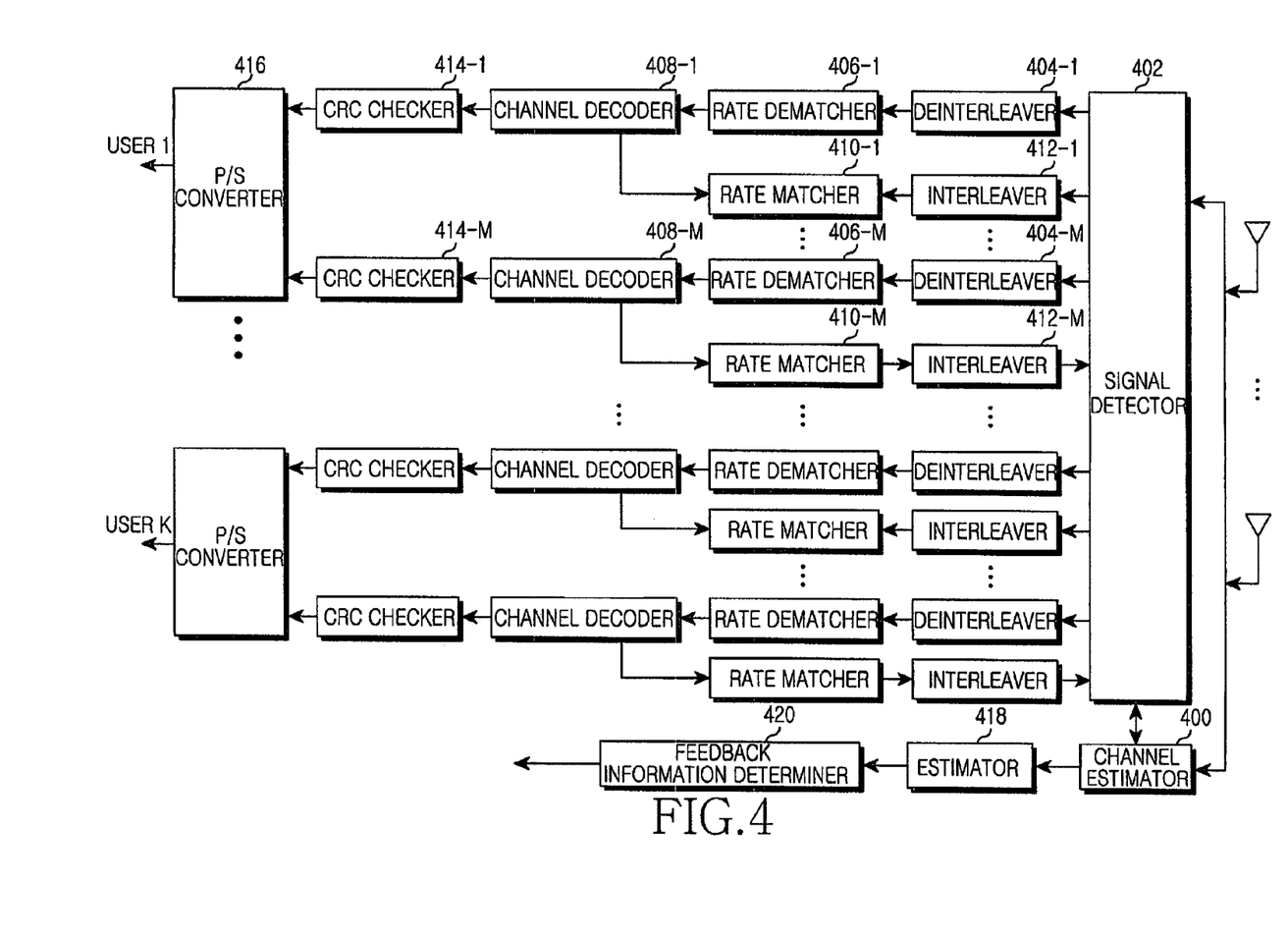
FIG. 4 is a block diagram of a receiver corresponding to the transmitter of FIG. 3.

FIG. 4 is a block diagram of a receiver corresponding to the transmitter of FIG. 3. The receiver may be a base station for uplink transmission or a user terminal for downlink transmission. The following description is made on the assumption that the receiver is a base station for uplink transmission. Signals of users are detected and demodulated using the same structure and thus only the signal of the first user (User 1) will be described herein.

Referring to FIG. 4, for the first user (User 1), the receiver includes a plurality of RX antennas, a channel estimator 400, a signal detector 402, a plurality of deinterleavers 404-1 to 404-M, a plurality of rate dematchers 406-1 to 406-M, a plurality of channel decoders 408-1 to 408-M, a plurality of rate matchers 410-1 to 410-M, a plurality of interleavers 412-1 to 412-M, a plurality of CRC checkers 414-1 to 414-M, and a P/S converter 416, an estimator 418, and a feedback information determiner 420.

The channel estimator 400 extracts pilot signals (or sounding signals) from signals received through at least one antenna, estimates channels using the extracted pilot signals, and provides the estimated channel values ((the number of TX antennas)×(the number of RX antennas)) to the estimator 418. Also, the channel estimator 420 calculates the channel values of equivalent channels ((the number of streams)×(the number of RX antennas)) using the pilot signals and a preceding matrix used by a transmitter, and provides the calculated channel values to the signal detector 402.

The signal detector 402 detects a stream for each transmission layer of each user on the basis of the channel values received from the channel estimator 400, and provides the detected stream to the corresponding deinterleaver 404. For example, the signal detector 402 detects each stream using the known multi-user detection scheme, calculates the soft-decision value of each bit of the stream, and provides the calculated value to the corresponding deinterleaver 404. Hereinafter, it is assumed that M streams are received from the first user (User 1).

The deinterleavers 404-1 to 404-M deinterleave soft-decision values from the signal detector 402. The deinterleaver 404-1 to 404-M for the first user may use the same interleaving scheme or different interleaving schemes. Also, the deinterleaving schemes for K users gaining multiple access to the base station are different for the purpose of IDMA.

Each of the rate dematchers 406-1 to 406-M rate-dematches data from the corresponding deinterleaver 404. Each of the channel decoders 408-1 to 408-M channel-decodes soft-decision values from the corresponding rate dematcher 406 to correct an error in the soft-decision values. Each of the channel decoders 408-1 to 408-M provides the error-corrected soft-decision values or hard-decision values to the corresponding rate matcher 410.

Each of the rate matchers 410-1 to 410-M rate-matches data from the corresponding channel decoder 408 in the same way as in the transmitter. Each of the interleavers 412-1 to 412-M interleaves data from the corresponding rate matcher 410 in the same way as in the transmitter and provides the same to the signal detector 402.

The signal detector 402 updates soft-decision values for each stream of the first user by using high-reliability soft-decision values (or hard-decision values) received from the interleavers 412-1 to 412-M. The signal detector 402 provides the updated soft-decision values of each stream to the corresponding deinterleaver 404 to perform iterative detection and decoding. If the above iteration is performed a predetermined number of times, or if the decoding results of the channel decoders satisfies predetermined conditions, the iteration is terminated and each of the channel decoders 408-1 to 408-M provides the decoded data (hard-decision values) resulting from the last iteration to the corresponding CRC checker 414.

Each of the CRC checkers 414-1 to 414-M performs a CRC check on data from the corresponding channel decoder 408, and transmits the corresponding data passed the CRC check to the P/S converter 416. If a CRC failure occurs, the CRC checker 414 notifies the CRC failure to an HARQ controller (not illustrated). In this case, the HARQ controller may transmit a retransmission request (NACK) signal to the transmitter.

The P/S converter 416 converts parallel data from the CRC checkers 414-1 to 414-M into serial data, and transmits the serial data to the next layer (for example, Layer 3).

Signals for the other users are also detected and decoded in the same way as above. The soft-decision values (or hard-decision values) updated by the iterative detection and decoding may be used to update channel values.

The estimator 418 estimates the signal power (or the average power) for each transmission layer of each user, an additive noise, and an interference of another cell using the channel values from the channel estimator 400 to which precoding is not applied.

The feedback information determiner 420 preliminarily determines the number of transmission layers for each user and an MCS level for each transmission layer, based on the signal power for each transmission layer of each user, the additive noise, and the interference of another cell, which are received from the estimator 418, and verifies and readjusts the preliminarily-determined MCS level. The feedback information determiner 420 generates feedback information including the determined number of transmission layers and the determined MCS level for each transmission layer, and transmits the generated feedback information to the corresponding user terminal. The detailed construction and operation of the feedback information determiner 420 will be described below with reference to FIG. 5.

Figure 5:
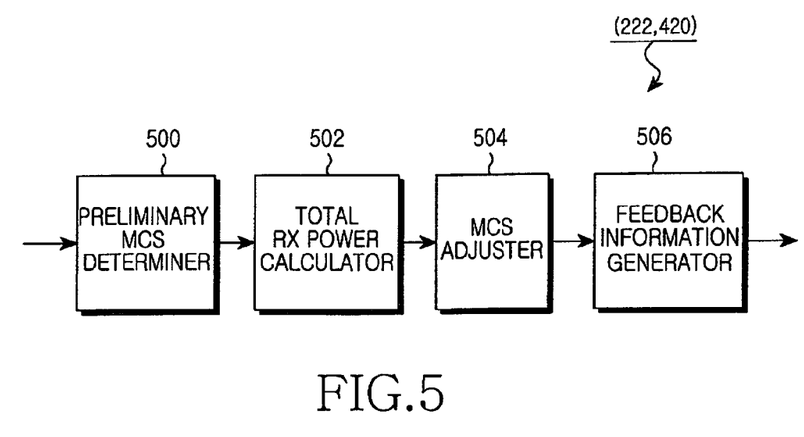
FIG. 5 is a block diagram of a feedback information determiner according to an exemplary embodiment of the present invention.

FIG. 5 is a block diagram of the feedback information determiner 222/420 according to an exemplary embodiment of the present invention.

Referring to FIG. 5, the feedback information determiner includes a preliminary MCS determiner 500, a total RX power calculator 502, an MCS adjuster 504, and a feedback information generator 506. Hereinafter, the signal power for the $t^{th}$ transmission layer of the $k^{th}$ user measured at the receiver will be denoted by $P_{k,t}$.

Referring to FIG. 5, the preliminary MCS determiner 500 preliminarily determines the number of transmission layers (or the number of streams) and an MCS level for each transmission layer with respect to each of K users that gain multiple access using different interleaving schemes. For determination of the number of transmission layers with respect to the $k^{th}$ user, the preliminary MCS determiner 500 arranges the signal powers for the respective transmission layers received from the estimator 220/418 in descending order of strength, and calculates a data rate for each of the numbers of transmission layers.

When the number of selected transmission layers is t, a data rate can be expressed as Equations (1) and (2), depending on the structures of the transmitter. Equation (1) corresponds to the use of the transmitter of FIG. 1, while Equation (2) corresponds to the user of the transmitter of FIG. 3.

$$R_t = t \cdot MCS\left(\sum_{l=1}^{t} P_{k,l}/t\sigma^2\right) \quad (1)$$

$$R_t = \sum_{l=1}^{t} MCS\left(\frac{P_{k,l}}{t\sigma^2}\right) \quad (2)$$

where $P_{k,l}$ denotes the signal power for the $l^{th}$ transmission layer of the $k^{th}$ user, $\sigma^2$ denotes the power of a noise including an additive noise and an interference of another cell, and MCS( ) denotes a function for calculating a data rate depending on the MCS level.

The data rate depending on the MCS level may be obtained from an MCS table of Table 1. Because there may be a difference depending on the time selectivity and the frequency selectivity of a channel even in the same SINR, the MCS table is preferably designed in consideration of such characteristics. Because the t transmission layers have the same TX power before preceding, the signal power of the $l^{th}$ transmission layer can be denoted by $P_{k,l}/t$ in Equations (1) and (2). In Equations (1) and (2), only an additive noise and an interference of another cell are considered without consideration of an interference of the same cell. The reason for this is that the IDMA scheme has the same performance as a single-user scheme in an SINR region exceeding a predetermined threshold value. The threshold value for each MCS level can be obtained by experiment. In this exemplary embodiment of the present invention, a table storing the threshold values is defined as a refinement table.

Also, the preliminary MCS determiner 500 compares the current data rate $R_p$ for selection of (t-1) transmission layers with the previous data rate $R_t$ for selection of t transmission layers. If the current data rate $R_t$ is lower than the previous data rate $R_p$, the preliminary MCS determiner 500 stops the data rate calculation and allows (t-1) transmission layers for the $k^{th}$ user. Also, the preliminary MCS determiner 500 preliminarily determines an MCS level for each of the (t-1) transmission layers by using the MCS table. In this way, the preliminary MCS determiner 500 determines the number of transmission layers and an MCS level for each transmission layer on a user-by-user basis.

Based on the determined number of transmission layers, the total RX power calculator 502 calculates the total power in a base station as Equation (3):

$$P_r = \sigma^2 + \sum_{k=1}^{K} \frac{1}{t_k} \sum_{l=1}^{t_k} P_{k,l} \qquad (3)$$

where $t_k$ denotes the number of transmission layers for the $k^{th}$ user, and $\sigma^2$ denotes noise power. If the noise power is small, it may be excluded from Equation (3).

Using the calculated total RX power, the MCS adjuster 504 calculates an SINR for each transmission layer of each user as Equation (4):

$$\overline{SINR_{k,l}} = \frac{P_{k,l}/t_k}{P_r - P_{k,l}/t_k} \qquad (4)$$

Also, the MCS adjuster 504 obtains a threshold value for the preliminarily-determined MCS level from a refinement table of Table 2, and compares the calculated SINR value with the obtained threshold value. If the calculated SINR value is larger than the obtained threshold value, the MCS adjuster 504 sets the corresponding preliminary MCS level to the final MCS level. That is, if the calculated SINR value is smaller than a threshold value for a preliminarily-determined MCS level, the preliminarily-determined MCS level is adjusted on the basis of the refinement table.

The feedback information generator 506 generates feedback information using the determined number of transmission layers for each user and the MCS level for each transmission layer, and transmits the generated feedback information to the corresponding user terminal. Although not illustrated in the drawings, the generated feedback information is processed at a transmitting unit (for example, a transmitting modem) and is fed back to the corresponding user terminal.

Figure 6:
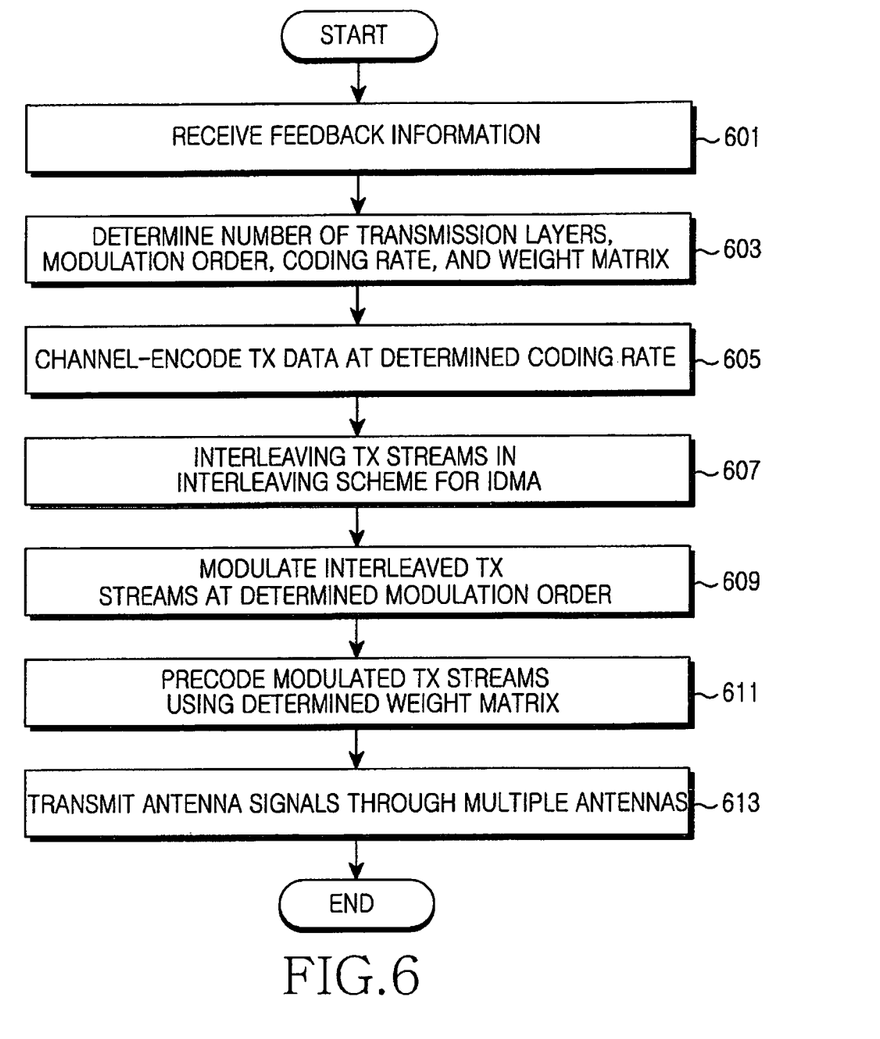
FIG. 6 is a flowchart illustrating an operation of a transmitter in an IDMA system according to an exemplary embodiment of the present invention.

FIG. 6 is a flowchart illustrating an operation of a transmitter in an IDMA system according to an exemplary embodiment of the present invention. Herein, the transmitter is a user terminal for uplink transmission or a base station for downlink transmission.

Referring to FIG. 6, the transmitter receives feedback information from a receiver in step 601. The feedback information may include at least one of information about the number of transmission layers, an MCS level for each transmission layer, and a weight matrix for precoding. The receiver may transmit the feedback information to the transmitter at predetermined time periods or at the request of the transmitter. The feedback periods of the weight matrix, the transmission layer number, and the MCS level for each transmission layer may be different from each other.

In step 603, the transmitter interprets the received feedback information and determines the number of transmission layers, an MCS level (a coding rate and a modulation order) for each stream, and a weight matrix for precoding based on the interpretation results.

In step 605, the transmitter channel-encodes TX data at the determined coding rate. The TX data are encoded at a low coding rate for IDMA. The channel encoding may be performed for each transmission layer as illustrated in FIG. 3. In this case, the TX data may be converted into a plurality of streams and the channel encoding may be performed for each stream.

In step 607, the transmitter interleaves each of TX streams in an interleaving scheme set by signaling negotiation. The interleaving scheme is set to be different from an interleaving scheme for another user. Also, the interleaving schemes for TX streams may be identical to or different from each other.

In step 609, the transmitter modulates each of the interleaved TX streams at the determined modulation order. The modulation orders for the TX streams may be identical to or different from each other.

In step 611, the transmitter precodes the modulated TX streams by the determined weight matrix to generate a plurality of antenna signals. In step 613, the transmitter transmits the antenna signals through the corresponding antennas. In the case of an OFDM system, the antenna signals are OFDM-modulated by IFFT, the OFDM-modulated signals are converted into RF signals, and the RF signals are transmitted through the corresponding antennas.

Figure 7:
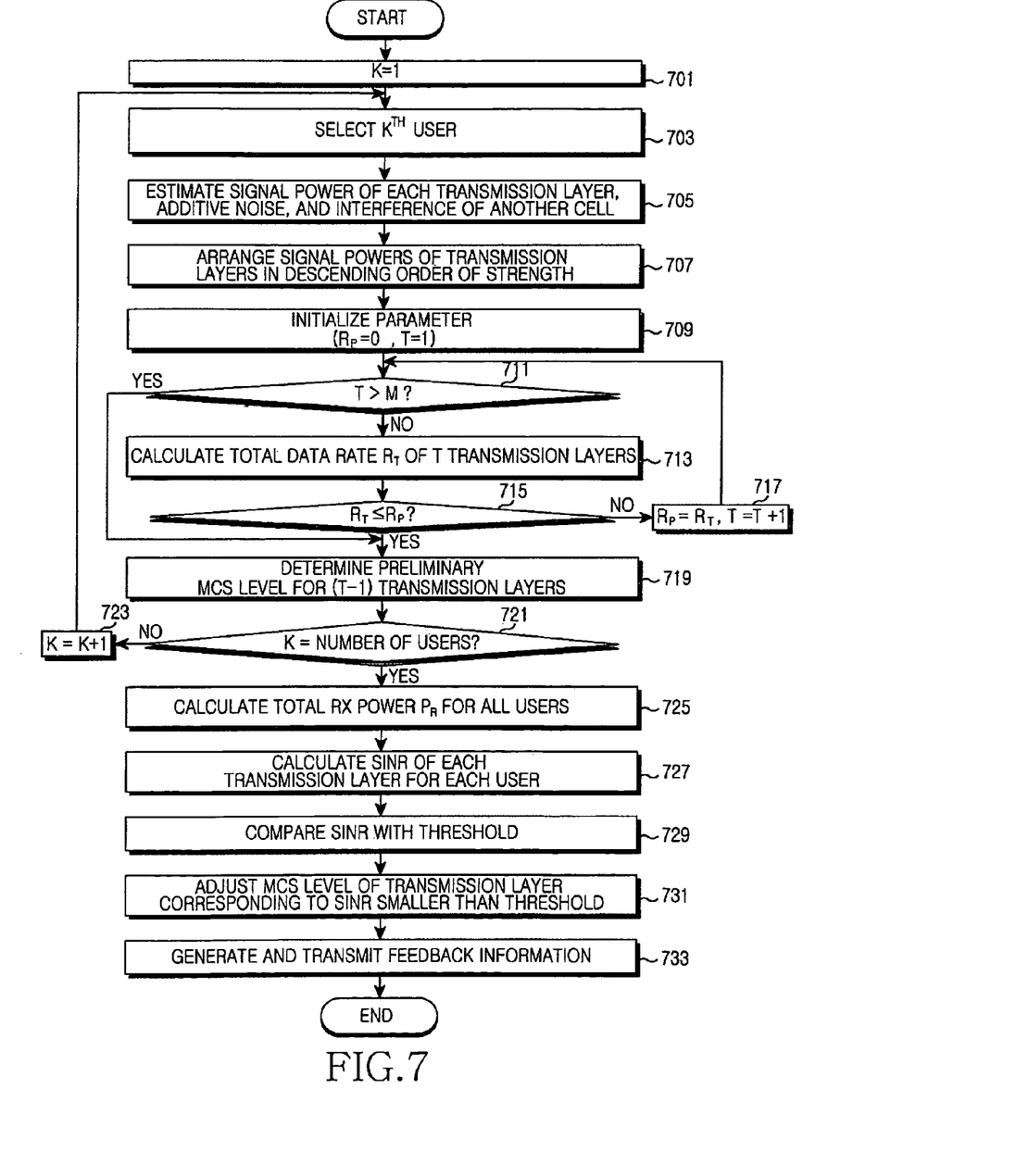
FIG. 7 is a flowchart illustrating an operation of a receiver in an IDMA system according to an exemplary embodiment of the present invention.

FIG. 7 is a flowchart illustrating an operation of a receiver in an IDMA system according to an exemplary embodiment of the present invention. Herein, the receiver is a base station for uplink transmission or a user terminal for downlink transmission. FIG. 7 illustrates a procedure for generating feedback information at a base station for uplink transmission.

Referring to FIG. 7, the receiver arranges k users gaining multiple access through IDMA and initializes a user index k to '1' in step 701. In step 703, the receiver selects the $k^{th}$ user.

In step 705, the receiver estimates a channel using an RX signal and estimates the signal power of each transmission layer for the $k^{th}$ user, an additive noise, and an interference of another cell using the estimated channel value. In step 707, the receiver arranges the signal powers of the respective transmission layers in descending order of strength. Herein, the signal power for the $t^{th}$ transmission layer of the $k^{th}$ user will be defined as $P_{k,t}$. As the index t increases, the signal power decreases.

In step 709, the receiver initializes a parameter $R_p$ indicating the previous data rate to '0' and initializes a transmission layer index t to '1'. In step 711, the receiver checks whether the transmission layer index t is larger than the total transmission layer number M. If the transmission layer index t is larger than the total transmission layer number M, the receiver proceeds directly to step 719; and if not, the receiver proceeds to step 713.

In step 713, the receiver calculates the total data rate $R_t$ for t transmission layers using Equation (1) or Equation (2). Herein, it is assumed that the total data rate $R_t$ is calculated using Equation (2). That is, the total data rate for the case where t transmission layers are allowed for the $k^{th}$ user is calculated. In step 715, the receiver compares the calculated current data rate $R_t$ with the prestored previous data rate $R_p$.

If the current data rate $R_t$ is larger than the previous data rate $R_p$, the receiver proceeds to step 717 in order to add one more transmission layer. That is, in step 717, the receiver stores the current data rate $R_t$ as the previous data rate $R_p$ and increases the transmission layer index t by 1. Thereafter, the receiver's operation returns to step 711.

On the other hand, if the current data rate $R_t$ is smaller than or equal to the previous data rate $R_p$, the receiver proceeds to step 719. In step 719, the receiver preliminarily determines an MCS level (a coding rate and a modulation order) for each of (t-1) transmission layers using an MCS table. That is, the receiver allows (t-1) streams for the $k^{th}$ user and preliminarily determines an MCS level for each stream.

In step 721, the receiver checks whether the user index k reaches the total user number. If the user index k does not reach the total user number, the receiver proceeds to step 723.

The receiver increases the user index k by 1 in step 723 and returns to step 703. On the other hand, if the user index k reaches the total user number, the receiver proceeds to step 725. In step 725, based on the determined number of transmission layers of each user, the receiver calculates the total RX power $P_r$ of the base station as Equation (3).

In step 727, using the calculated total RX power, the receiver calculates an SINR for each transmission layer of each user as Equation (4). In step 729, the receiver obtains a threshold value for the preliminarily-determined MCS level from a refinement table and compares the calculated SINR value with the obtained threshold value. The receiver determines to adjust the MCS levels of transmission layers having the SINR value smaller than the threshold value.

That is, in step 731, the receiver adjusts the MCS level of the transmission layer corresponding to the SINR value smaller than the threshold value, based on the refinement table. For example, if the calculated SINR value is larger than the threshold value, the corresponding preliminary MCS level is set to the final MCS level. On the other hand, if the calculated SINR value is smaller than the threshold value, the MCS level of a threshold value smaller than the calculated SINR value is set to the final MCS level on the basis of the refinement table.

In step 733, the receiver generates feedback information using the final transmission layer number for each user and the MCS level for each transmission layer, and transmits the generated feedback information to the corresponding user terminal. In this context, the generated feedback information is processed at a transmitting unit (for example, a transmitting modem) and is transmitted to the corresponding user terminal.

Table 1 shows an example of the MCS table, and Table 2 shows an example of the refinement table.

TABLE 1

| SINR (dB) | Modulation Order | Coding Rate | Data Rate |
|---|---|---|---|
| 0 | 2 | 1/3 | 2/3 |
| 2 | 2 | 1/2 | 1 |
| 4 | 4 | 1/3 | 4/3 |
| 6 | 2 | 3/4 | 3/2 |
| 8 | 2 | 7/8 | 7/4 |
| 10 | 4 | 1/2 | 2 |
| 12 | 4 | 3/4 | 3 |
| 14 | 4 | 7/8 | 7/2 |

TABLE 2

| Data Rate | Modulation Order | Coding Rate | Threshold Value |
|---|---|---|---|
| 2/3 | 2 | 1/3 | 0.10 |
| 1 | 2 | 1/2 | 0.14 |
| 4/3 | 4 | 1/3 | 0.16 |
| 3/2 | 2 | 3/4 | 0.18 |
| 7/4 | 2 | 7/8 | 0.2 |
| 2 | 4 | 1/2 | 0.3 |
| 3 | 4 | 3/4 | 0.4 |
| 7/2 | 4 | 7/8 | 0.5 |

Using Tables 1 and 2, the transmission layer number for each user and the MCS level for each transmission layer are determined as follows.

First, it is assumed that the signal powers of the respective transmission layers measured at the receiver with respect to two users having two TX antennas are $P_{1,1}=14$ dB, $P_{1,2}=8$ dB, $P_{2,1}=8$ dB, $P_{2,2}=6$ dB and the noise power is $\sigma^2=1$ dB. Also, it is assumed that the user terminals have a transmitter as illustrated in FIG. 3. In this case, the transmission layer number for each user and the preliminary MCS level for each transmission layer are determined as shown in Table 3.

TABLE 3

| | Number of Transmission Layers | Preliminary MCS Level for Each Transmission Layer |
|---|---|---|
| User 1 | 1 | Stream 1: Modulation Order 4, Coding Rate 7/8, Data Rate 3.5 |
| User 2 | 2 | Stream 1: Modulation Order 4, Coding Rate 1/3, Data Rate 4/3<br>Stream 2: Modulation Order 2, Coding Rate 1/2, Data Rate 1 |

Using Equation (4), the SINR values for the respective transmission layers are calculated as $SINR_{1,1}=2.2$, $SINR_{2,1}=0.2$, $SINR_{2,2}=0.12$. For verification of the preliminary MCS levels shown in Table 3, the calculated SINR values are compared with the corresponding threshold values shown in Table 2. If adjustment is necessary, the MCS level of the corresponding transmission layer is adjusted. In this context, the MCS level of only the second transmission layer of the second user (User 2) is updated to be a modulation order '2' and a coding rate '1/3'.

As described above, exemplary embodiments of the present invention change the transmission layer, the modulation order, and the error correction code adaptively according to the channel states, thereby making it possible to maximize the data transmission efficiency. That is, the present invention makes it possible to increase the uplink data rate of the next-generation communication system. Also, the present invention determines the transmission layer, the modulation order, and the error correction code in combination and on a user-by-user basis, thereby making it possible to considerably reduce the system complexity.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A receiving apparatus for an Interleaver Division Multiple Access (IDMA) system, the apparatus comprising:
   a channel estimator for estimating a channel using a multi-user signal received through at least one RX antenna;
   an estimator for estimating the noise power and the signal power for each transmission layer of each user by using the estimated channel value from the channel estimator; and
   a determiner for determining the number of transmission layers for each user and an Modulation and Coding Scheme (MCS) level for each transmission layer of each user by using the signal power and the noise power estimated by the estimator,
   wherein the multi-user signal includes multiple user signals being interleaved in different interleaving schemes with each other,
   wherein the determiner comprises a preliminary determiner for preliminarily determining the number of transmission layers and the MCS level for each transmission layer on a user-by-user basis on the basis of a Signal-to-Noise Ratio (SNR) with respect to each of users that gain multiple access in different interleaving schemes, and wherein the preliminary determiner calculates a data rate $R_t$ for selection of t transmission layers by using Equation (1) or Equation (2) depending on a structure of a corresponding transmitter $$R_t = t \cdot MCS\left(\sum_{l=1}^{t} P_{k,l}/t\sigma^2\right) \quad (1)$$

$$R_t = \sum_{l=1}^{t} MCS\left(\frac{P_{k,l}}{t\sigma^2}\right) \quad (2)$$

where $P_{k,l}$ denotes the signal power for the $l^{th}$ transmission layer of the $k^{th}$ user, $\sigma^2$ denotes noise power, and MCS( )denotes a function for calculating a data rate depending on the MCS level.

2. The receiving apparatus of claim 1, wherein the determiner further comprises:
a calculator for calculating a total receive power on the basis of the determined transmission layer numbers for the users;
an adjuster for calculating a Signal-to-Interference plus Noise Ratio (SINR) for each transmission layer of each user by using the calculated total RX power to, and adjusting the preliminary MCS level by comparing the calculated SINR value with a threshold value; and
a feedback information generator for generating feedback information by using a final transmission layer number for each user and the MCS level for each transmission layer, and transmitting the generated feedback information to the corresponding user.

3. The receiving apparatus of claim 1, wherein the preliminary determiner arranges the signal powers for the respective transmission layers in descending order of strength,
calculates the data rate for each of the transmission layers while adding the arranged transmission layers one by one,
compares a previous data rate for selection of (t-1) transmission layers with a current data rate for selection of t transmission layers,
allows (t-1) transmission layers for the corresponding user if the current data rate is smaller than the previous data rate, and
determines the preliminary MCS level for each of the allowed transmission layers.

4. The receiving apparatus of claim 2, wherein the calculator calculates the total RX power $P_r$ as the following equation:

$$P_r = \sigma^2 + \sum_{k=1}^{K} \frac{1}{t_k} \sum_{l=1}^{t_k} P_{k,l}$$

where $\sigma^2$ denotes noise power, k denotes a user index, $t_k$ denotes the number of transmission layers for the $k^{th}$ user, and $P_{k,l}$ denotes the signal power for the $l^{th}$ transmission layer of the $k^{th}$ user.

5. The receiving apparatus of claim 2, wherein the adjuster calculates the SINR for the $l^{th}$ transmission layer of the $k^{th}$ user as the following equation:

$$\overline{SINR_{k,l}} = \frac{P_{k,l}/t_k}{P_r - P_{k,l}/t_k}$$

where $P_r$ denotes the total RX power, $t_k$ denotes the number of transmission layers for the $k^{th}$ user, and $P_{k,l}$ denotes the signal power for the $l^{th}$ transmission layer of the $k^{th}$ user.

6. The receiving apparatus of claim 2, wherein the threshold value is determined by the SINR for the preliminarily-determined MCS level.

7. The receiving apparatus of claim 1, further comprising a receiver unit for detecting and decoding the received multi-user signal in an IDMA scheme.

8. The receiving apparatus of claim 1, wherein the feedback information comprises at least one of the number of transmission layers, a modulation order and a coding rate for each transmission layer, and a weight matrix for precoding.

9. A method for an operation of a receiver in an Interleaver Division Multiple Access (IDMA) system, the method comprising:
estimating, by the receiver, a channel using a multi-user signal received through at least one RX antenna;
estimating, by the receiver, the noise power and the signal power for each transmission layer of each user by using the estimated channel value; and
determining, by the receiver, the number of transmission layers for each user and an Modulation and Coding Scheme (MCS) level for each transmission layer of each user by using the estimated signal power and the estimated noise power,
wherein the multi-user signal includes multiple user signals being interleaved in different interleaving schemes with each other,
wherein the determining comprises preliminarily determining the number of transmission layers and the MCS level for each transmission layer on a user-by-user basis on the basis of a Signal-to-Noise Ratio (SNR) with respect to each of users that gain multiple access in different interleaving schemes,
wherein the preliminary determining comprises:
arranging the signal powers for the respective transmission layers in descending order of strength;
calculating a data rate for each of the transmission layer numbers while adding the arranged transmission layers one by one;
comparing a previous data rate for selection of (t-1) transmission layers with a current data rate for selection of t transmission layers;
allowing (t-1) transmission layers for the corresponding user if the current data rate is smaller than the previous data rate; and
determining the preliminary MCS level for each of the allowed transmission layers, and
wherein when the number of transmission layers is t, a data rate $R_t$ is calculated using Equation (1) or Equation (2) depending on a structure of a corresponding transmitter $$R_t = t \cdot MCS\left(\sum_{l=1}^{t} P_{k,l}/t\sigma^2\right) \quad (1)$$

$$R_t = \sum_{l=1}^{t} MCS\left(\frac{P_{k,l}}{t\sigma^2}\right) \quad (2)$$

where $P_{k,l}$ denotes the signal power for the $l^{th}$ transmission layer of the $k^{th}$ user, $\sigma^2$ denotes noise power, and MCS( ) denotes a function for calculating a data rate depending on the MCS level.

10. The method of claim 9, wherein the determining further comprises:
   calculating a total receive power on the basis of the determined transmission layer numbers for the users;
   calculating a Signal-to-Interference plus Noise Ratio (SINR) for each transmission layer of each user by using the calculated total RX power to, and adjusting the preliminary MCS level by comparing the calculated SINR value with a threshold value;
   generating feedback information by using a final transmission layer number for each user and the MCS level for each transmission layer; and
   transmitting the generated feedback information to the corresponding user.

11. The method of claim 10, wherein the total RX power Pr is calculated as the following equation:

$$P_r = \sigma^2 + \sum_{k=1}^{K} \frac{1}{t_k} \sum_{l=1}^{t_k} P_{k,l}$$

where $\sigma_2$ denotes noise power, k denotes a user index, $t_k$ denotes the number of transmission layers for the $k^{th}$ user, and $P_{k,l}$ denotes the signal power for the $l^{th}$ transmission layer of the $k^{th}$ user.

12. The method of claim 10, wherein the SINR for the $l^{th}$ transmission layer of the $k^{th}$ user is calculated as the following equation:

$$\overline{SINR_{k,l}} = \frac{P_{k,l}/t_k}{P_r - P_{k,l}/t_k}$$

where $P_r$ denotes the total RX power, $t_k$ denotes the number of transmission layers for the $k^{th}$ user, and $P_{k,l}$ denotes the signal power for the $l^{th}$ transmission layer of the $k^{th}$ user.

13. The method of claim 10, wherein the threshold value is determined by the SINR for the preliminarily-determined MCS level.

14. The method of claim 9, further comprising restoring information data of each user by detecting and decoding the received multi-user signal in an IDMA scheme.

15. The method of claim 9, wherein the feedback information comprises at least one of the number of transmission layers, a modulation order and a coding rate for each transmission layer, and a weight matrix for precoding.

* * * * *